N. C. STOREY.
CONTROL DEVICE FOR DRIVEN MEMBERS.
APPLICATION FILED NOV. 7, 1919.
1,387,208.
Patented Aug. 9, 1921.
2 SHEETS—SHEET 1.
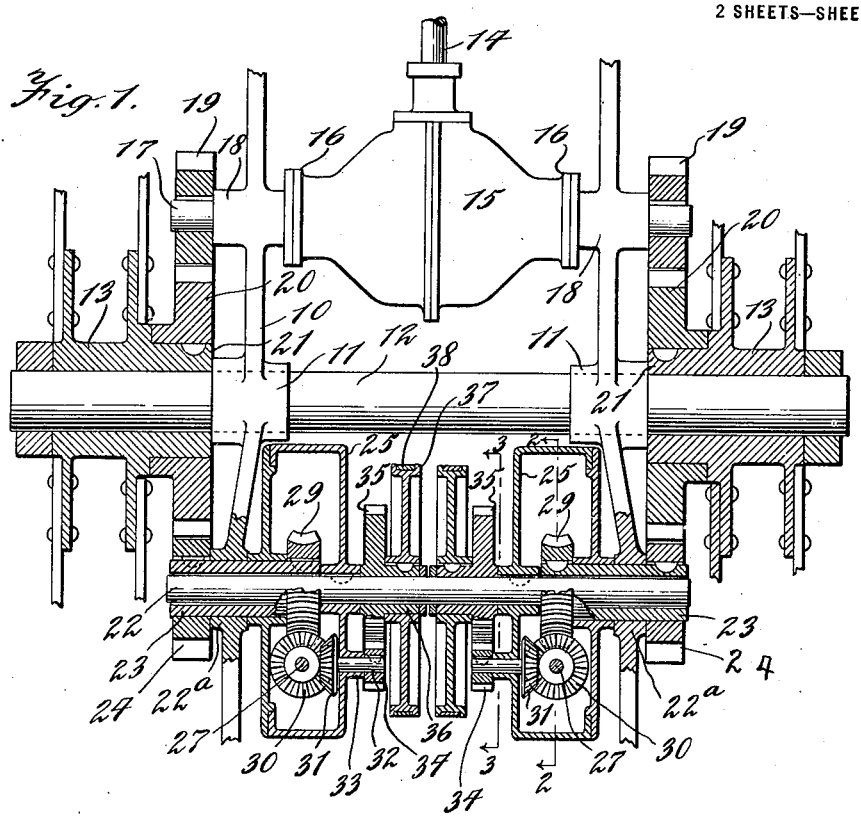
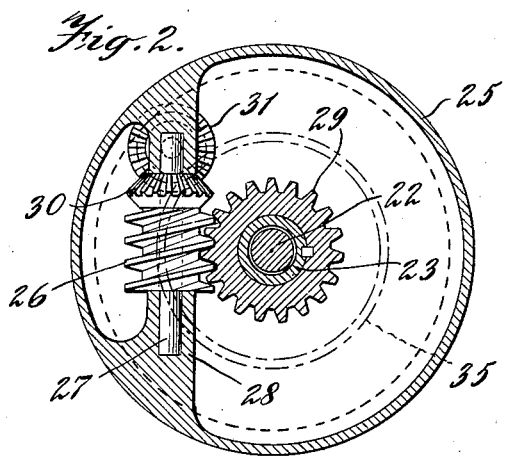
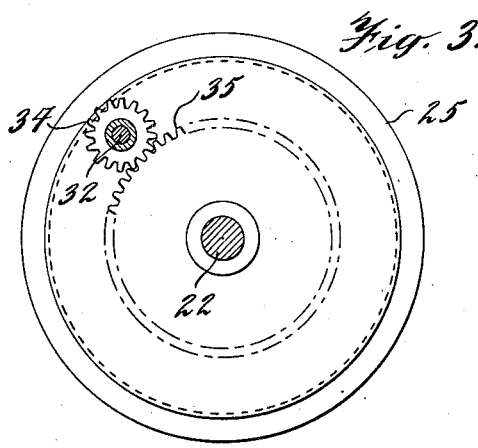
WITNESS:
INVENTOR.
Norman C. Storey
BY
Gifford & Bull
his ATTORNEY.

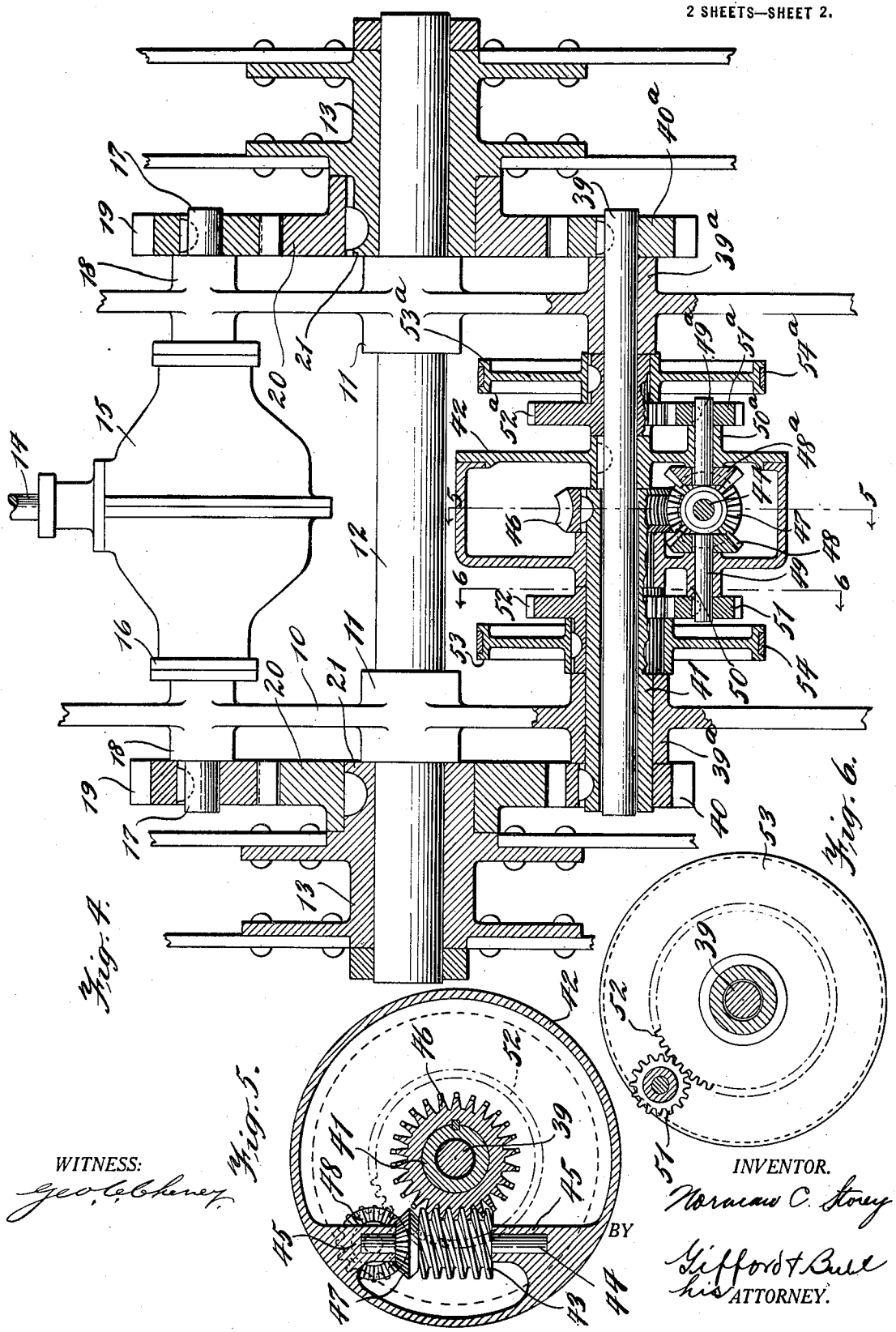

UNITED STATES PATENT OFFICE.

NORMAN C. STOREY, OF PASSAIC, NEW JERSEY.

CONTROL DEVICE FOR DRIVEN MEMBERS.

1,387,208.   Specification of Letters Patent.   Patented Aug. 9, 1921.

Application filed November 7, 1919. Serial No. 336,491.

*To all whom it may concern:*

Be it known that I, NORMAN C. STOREY, a citizen of the United States, residing in Passaic, in the county of Passaic and State of New Jersey, have invented certain new and useful Improvements in Control Devices for Driven Members, of which the following is a specification.

While my invention is of general application, it is particularly useful when applied to a vehicle for changing the relative speeds of the driving wheels and thereby steering the vehicle.

Other objects of my invention will appear in the specification and will be particularly pointed out in the claims.

My invention will best be understood by reference to the accompanying drawing, in which like reference characters indicate like parts, and in which Figure 1 is a sectional plan view of a vehicle embodying my invention; Fig. 2 is a section on the line 2—2 of Fig. 1; Fig. 3 is a section on the line 3—3 of Fig. 1; Fig. 4 is a view similar to Fig. 1 illustrating a modified form of my invention; Fig. 5 is a sectional view taken on the line 5—5 of Fig. 4, and Fig. 6 is a sectional view on the line 6—6 of Fig. 4.

Referring now to the drawings, and first to Figs. 1, 2 and 3, in which I have shown the preferred form of my invention, 10 is the frame of the vehicle provided with boxes 11, in which a dead axle 12 has its bearings. On the ends of the axle are loosely mounted the driven members or steering wheels 13. The wheels are driven from a shaft 14 connected to a suitable source of power, through a differential mechanism contained within a casing 15, and provided with flanges 16 by which the casing is secured to the frame of the machine. The two shafts 17 of the differential mechanism have their bearings at 18 in the frame, and secured thereto are gears 19 meshing with gears 20, which are secured on the hubs 21 of the wheels 13, it being understood that in the embodiment of my invention here shown, the parts on either side of the center line are similar and similarly arranged.

The driven wheels 13 are normally locked together to rotate at the same speed, by a mechanism comprising a shaft 22. On each end of the shaft 22 is loosely mounted a sleeve 23 having its bearings in the frame of the machine at 22ª and to each of which is secured a gear 24 meshing with the corresponding gear 20 which is secured to the wheel. The two gears 24 are normally locked together by self-locking gears duplicated on either side of the center line, and comprising a gear casing 25, within which is mounted a worm 26, on a shaft 27, having its bearings at 28 in the casing. The worm 26 engages a worm wheel 29 secured on the sleeve 23. On the shaft 27 is also mounted a bevel gear 30 engaging a bevel 31, mounted on a shaft 32, having its bearings at 33 in the casing 25. On the outer end of the shaft 32, and without the casing, is secured a pinion 34 which meshes with a gear 35 having a hub 36 loosely surrounding the shaft 22. A friction drum 37 is secured on the hub of said gear and is engaged by a friction band 38.

The operation of the device embodying my invention will readily be understood from the foregoing description and is as follows: Since the casings 25 are both secured to the shaft 22, they rotate together, and as the two worms mounted within the casings normally form a self-locking engagement with the worm wheels 29, which are in turn secured to the gears 24, the worm gears, and correspondingly the gears 24 rotate at the same speed, thus causing the driving wheels 13 to rotate at the same speed. Now, when it is desired to steer the vehicle in one direction or the other, the operator applies the friction band 38 to one friction drum or the other, and thus arrests the rotation of the corresponding gear 35, causing pinion 34 to rotate on its own axis, thereby driving bevels 31 and 30, and thus rotating the worm 26, thereby rotating the worm wheel 29, the parts being constructed and arranged to cause the corresponding worm wheel to rotate at a slower speed than does the corresponding worm wheel on the other side of the vehicle, and thus brings about a change of relative speeds in the two driven wheels, and this effects the steering of the vehicle. Inasmuch as the steering is effected in each case by decreasing the speed of rotation of one wheel with respect to that of the other, it is effected with the expenditure of the minimum amount of work.

In Figs. 4, 5 and 6, I have shown a modified form of my invention in which but a single self-locking gear is used. In this form, the parts between the shaft 14 and the steering or drive wheels 13 are, or may be, the same as the correspondingly numbered parts of Figs. 1, 2 and 3 and need not again be described.

The steering mechanism by which the two wheels are normally locked together and by which their relative speeds may be varied, comprises a shaft or axle 39 having its bearings in boxes 39ª of the frame. A gear 40ª is secured to the right-hand end of the shaft 39 and meshes with the gear 20 at the right. On the other end of the shaft 39, is loosely mounted a sleeve 41, on the outer end of which is secured a gear 40 meshing with the gear 20 at the left, the two gears 40 and 40ª being normally locked together by a self-locking worm gear, which in the form here shown, is housed within a gear casing 42, one side of which is mounted on and secured to the shaft 39, the other side of the casing preferably having a loose bearing on the sleeve 41. A worm 43 (see Fig. 5) is secured on a shaft 44 having its bearings at 45 in the casing 42, so that the worm rotates with the casing. The worm meshes with and normally forms a self-locking engagement with a worm gear 46 secured on the inner end of the sleeve 41. Secured on the shaft 44 of the worm 43 is a bevel gear 47, which engages two bevel gears 48 and 48ª secured on shafts 49 and 49ª, having their bearings at 50 and 50ª in opposite sides of the casing 42. On the outer ends of the respective shafts are secured pinions 51 and 51ª which mesh with gears 52 and 52ª loosely mounted on the sleeve 41 and on the shaft 39, respectively. The two gears 52 and 52ª are provided with hubs on which are secured friction drums or wheels 53 and 53ª, respectively, and which are engaged by friction bands 54 and 54ª.

The operation of the device shown in Figs. 4, 5 and 6 is as follows: Normally, the worm 43 and worm wheel 46 are locked together, thereby causing the two geared members 40 and 40ª to be driven by the gears 20 secured to the respective driving wheels at the same speed. Under these conditions, the bevel pinions 48 and 48ª are rotated in opposite directions by the bevel gear 47, the pinions correspondingly rotating the gears 52 and 52ª. Now, when it is desired to change the relative speeds of the driven members 13 and thereby steer the vehicle, the operator applies the friction band 54 or 54ª, thereby arresting the rotation of the friction drum 53 or 53ª. This prevents the rotation of gear 52 or 52ª and causes gear 51 or 51ª to rotate on its own axis and drive bevels 48 and 47 or 48ª and 47 and thus rotate the worm in one direction or the other, depending upon the friction band that has been applied, and either increases or decreases the speed of rotation of the gear 40 with reference to the gear 40ª, and correspondingly changes the relative speeds of the wheels 13, such change of speed being permitted by the differential within the casing 15.

While I have herein shown and described one modification of my invention, I do not desire to be limited to the exact arrangement shown and described, but seek to cover, in the appended claims, all those modifications which come within the true spirit and scope of my invention.

What I claim and desire to secure by Letters Patent of the United States is:—

1. In combination, two driven members, means for normally locking said members together comprising a self-locking worm and gear constructed and arranged normally to rotate with said driven members, and means for causing relative movement between said worm and gear to vary the relative movement between said driven members.

2. In combination, two driven members, means for normally locking said members together comprising a self-locking worm and gear, and gear connections between the same and said driven members, said worm and gear and said gear connections being constructed and arranged normally to rotate as a unit, and means for causing relative movement between said worm and gear to vary the relative movement between said driven members.

3. In combination, two driven members, two members geared to said driven members, means comprising two self-locking gears, themselves locked together for locking together said geared members, and means for rotating either self-locking gear.

4. In combination, two driven members, two members geared to said driven members, and two self-locking gears connected to the respective geared members and themselves locked together whereby said geared members are normally locked together, and means for rotating either self-locking gear, and thereby changing the relative speeds of said driven members.

5. In combination, two driven members, two members geared to said driven members, means for normally locking together said geared members comprising two self-locking gears, one element of each of which is secured to the respective geared members, and the other elements of which are locked together, and means for rotating the respective self-locking gears and thereby varying the relative speeds of said driven members in either direction.

6. In combination, two driven members, two members geared to said driven members, means for normally locking together said geared members comprising two worm wheels secured to the respective geared members, two casings secured together and housing the respective worm wheels, worms mounted in the respective casings and forming self-locking engagements with the respective worm wheels, and associated means for rotating either of said worms and thereby changing the relative speeds of said driven members.

7. In a vehicle, two drive wheels, members geared to rotate with the respective wheels, means for normally locking said geared members together comprising two self-locking gears, one element of each of which is secured to one of said geared members, and the other elements of which are constructed and arranged to rotate together, and means for rotating either self-locking gear and thereby changing the relative speeds of said wheels in either direction.

8. In a steering device, two drive wheels, means comprising two sets of self-locking worms and gears geared to the respective wheels for normally locking said wheels together, whereby they normally rotate at the same rim speed, and means under the control of the operator for changing the relative rim speeds of said wheels through said self-locking gears.

9. In a steering device, two drive wheels, two self-locking worms and gears geared to the respective wheels and connected together by a common member, whereby said wheels normally rotate at the same rim speed, and means under the control of the operator for changing the relative rim speeds of said wheels through said self-locking gears.

10. In a steering device, two drive wheels, two sets of self-locking worms and gears connected to the respective wheels and connected by a common member, whereby said wheels are normally locked together to rotate at the same rim speed, and means under the control of the operator for rotating either worm on its own axis and thereby changing the relative speeds of said wheels.

NORMAN C. STOREY.